United States Patent
Schmidt

(10) Patent No.: US 7,970,071 B2
(45) Date of Patent: *Jun. 28, 2011

(54) METHOD AND DEVICE FOR SYNCHRONIZING THE CARRIER FREQUENCY OF AN OFFSET QUADRATURE PHASE-MODULATED SIGNAL

(75) Inventor: Kurt Schmidt, Grafing (DE)

(73) Assignee: Robde & Schwarz GmbH & Co. KG, München (DE)

( * ) Notice: Subject to any disclaimer, the term of this patent is extended or adjusted under 35 U.S.C. 154(b) by 976 days.

This patent is subject to a terminal disclaimer.

(21) Appl. No.: 11/663,861

(22) PCT Filed: Sep. 27, 2005

(86) PCT No.: PCT/EP2005/010435
§ 371 (c)(1),
(2), (4) Date: Jul. 2, 2007

(87) PCT Pub. No.: WO2006/034845
PCT Pub. Date: Apr. 6, 2006

(65) Prior Publication Data
US 2007/0258534 A1  Nov. 8, 2007

(30) Foreign Application Priority Data

Sep. 28, 2004 (DE) .......................... 10 2004 047 034
Dec. 1, 2004 (DE) .......................... 10 2004 058 015
Dec. 22, 2004 (DE) .......................... 10 2004 061 857

(51) Int. Cl.
*H04L 23/02* (2006.01)

(52) U.S. Cl. ........ 375/262; 375/341; 375/285; 375/330; 375/321; 348/608; 348/725

(58) Field of Classification Search .................. 375/262, 375/341, 330, 321, 285; 348/608, 725
See application file for complete search history.

(56) References Cited

U.S. PATENT DOCUMENTS 5,654,667 A * 8/1997 Adachi .......................... 329/306
5,706,313 A * 1/1998 Blasiak et al. ................. 375/330
(Continued)

FOREIGN PATENT DOCUMENTS
DE     196 51 993 A1    7/1997
(Continued)

OTHER PUBLICATIONS

International Search Report—PCT/EP2005/010435; Date of Mailing—Jan. 20, 2006.
(Continued)

*Primary Examiner* — Eva Y Puente
(74) *Attorney, Agent, or Firm* — Marshall, Gerstein & Borun LLP

(57) ABSTRACT

A method and a device for synchronizing the carrier frequency of a carrier signal comprising a frequency offset and/or a phase offset. According to the invention, the method estimates the frequency offset and/or phase offset of the carrier signal by means of a maximum likelihood estimation from a received signal, which comprises temporally discrete, complex rotary indices, for which only the temporally discrete phases are dependent on the frequency offset and/or phase offset. An offset quadrature-modulated received signal is thus converted into a modified received signal comprising temporally discrete, complex rotary indices, for which only the temporally discrete phases are dependent on the frequency offset and/or the phase offset.

9 Claims, 3 Drawing Sheets

U.S. PATENT DOCUMENTS

| | | | |
|---|---|---|---|
| 5,790,602 A | 8/1998 | Stephens | |
| 6,111,923 A * | 8/2000 | Mueller et al. | 375/341 |
| 6,301,311 B1 | 10/2001 | Sheba | |
| 6,560,303 B1 | 5/2003 | Fan et al. | |
| 6,647,070 B1 * | 11/2003 | Shalvi et al. | 375/285 |
| 6,775,334 B1 | 8/2004 | Liu et al. | |
| 7,587,003 B2 * | 9/2009 | Pliquett et al. | 375/321 |
| 2003/0181183 A1 | 9/2003 | Ventura | |
| 2004/0071234 A1 * | 4/2004 | Li | 375/341 |
| 2007/0263742 A1 * | 11/2007 | Schmidt | 375/262 |

FOREIGN PATENT DOCUMENTS

| | | |
|---|---|---|
| DE | 103 09 262 A1 | 9/2004 |
| EP | 1 278 346 A2 | 1/2003 |
| EP | 1 441 463 A1 | 7/2004 |

OTHER PUBLICATIONS

International Preliminary Report of Patentability (English translation)—PCT/EP2005/010435 Original German report completed: Sep. 5, 2006.

* cited by examiner

METHOD AND DEVICE FOR SYNCHRONIZING THE CARRIER FREQUENCY OF AN OFFSET QUADRATURE PHASE-MODULATED SIGNAL

BACKGROUND OF THE INVENTION

1. Field of the Invention

The invention relates to a method and a device for carrier-frequency synchronization in the case of an offset quadrature-phase-modulated signal.

2. Related Technology

When transmitters and receivers are synchronized with one another in a transmission system, the clock-pulse and carrier signal are matched respectively with regard to phase position and frequency at the transmitter-end and receiver-end. The carrier-frequency synchronization to be considered below presupposes a received signal synchronized with regard to the clock-pulse signal.

DE 103 09 262 A1 describes a method for carrier-frequency synchronization of a signal with digital symbol sequences, in which the frequency and/or phase offset of the carrier signal is estimated from the demodulated received signal by means of maximum-likelihood estimation. The received signal containing the digital symbol sequence consists of complex rotary phasors associated with the individual sampling timing points, of which the discrete phases are dependent only upon the required frequency and/or phase offset of the carrier signal, and of which the discrete amplitudes are dependent only upon the digital symbol values of the demodulated received signal. The maximum-likelihood estimation of the required frequency and/or phase offset of the carrier signal is implemented by maximization of the likelihood function, which is formed from the sum of the real components of all time-discrete, complex rotary phasors of the received signal. The maximization of the likelihood function is implemented by rotating the complex rotary phasor of the received signal associated with each sampling timing point in the clockwise direction at the level of the required frequency and/or phase offset so that it is disposed on the real axis. In this manner, it is possible to obtain the required frequency and/or phase offset of the carrier signal by observing the extreme values of the likelihood function in each case separately for the frequency and/or phase offset.

In the context of DE 103 09 262 A1, the time-discrete received signal provides one complex rotary phasor at each sampling timing point, of which the phase value is dependent only upon the frequency and/or phase offset of the carrier signal, and of which the amplitude value is dependent upon the symbol value of the received signal sequence to be transmitted at the respective sampling timing point. A time-discrete received signal of this kind is based upon a comparatively simple modulation, for example, a conventional binary-phase phase sampling (BPSK). By contrast, if a more complex modulation method, especially an offset quadrature phase modulation (offset-QPSK-modulation) is used, considerable inter-symbol interference, which additionally disturbs the phases of the time-discrete complex rotary phasors, occurs in the received signal because of the squaring and also because of the phase displacement of the in-phase relative to the quadrature component at the level of half of the symbol period in the context of an offset QPSK modulation. Accordingly, the phases of the time-discrete complex rotary phasors of the received signal are not only dependent upon the frequency and/or phase offset of the carrier signal. In this case, the use of a maximum-likelihood estimation for the estimation of the required frequency and/or phase offset of the carrier signal in the sense of the method and the device known from the DE 103 09 262 A1 therefore fails to achieve the object.

SUMMARY OF THE INVENTION

The invention accordingly provides a method and a device for the estimation of the frequency and/or phase offset in the carrier signal in the case of an offset quadrature-phase-modulated received signal using a maximum-likelihood estimation.

The invention provides a method for carrier-frequency synchronization and by a device for carrier-frequency synchronization.

Accordingly, the invention provides a method for carrier-frequency synchronization of a carrier signal influenced by a frequency and/or phase offset by means of estimating the frequency and/or phase offset of the carrier signal by estimating maximum-likelihood from a received signal with time-discrete complex rotary phasors, in which only the time-discrete phases are dependent upon the frequency and/or phase offset, wherein the received signal is an offset quadrature-modulated received signal, which is converted for the maximum-likelihood estimation via a pre-filtering step into a modified received signal with time-discrete complex rotary phasors, in which only the time-discrete phases are dependent upon the frequency and/or phase offset, and of which the real components are maximized for the maximum-likelihood estimation of the frequency and/or phase offset.

The invention also provides a device for carrier-frequency synchronization of a carrier signal influenced by a frequency and/or phase offset with a maximum-likelihood estimator for the estimation of the frequency and/or phase offset of the carrier signal from a received signal with time-discrete complex rotary phasors, in which only the time-discrete phases are dependent upon the frequency and/or phase offset, wherein the maximum-likelihood estimator is preceded by a pre-filter and a signal-processor, which converts the received signal, which is an offset-quadrature-phase-modulated received signal, into a modified received signal with time-discrete complex rotary phasors, in which only the time-discrete phases are dependent upon the frequency and/or phase offset, and wherein the maximum-likelihood estimator maximizes the real components of the complex rotary phasors for the estimation of the frequency and/or phase offset.

According to the invention, the offset quadrature-phase-modulated received signal is converted, after a demodulation, a sampling with an over-sampling factor of typically eight and a pre-filtering with a signal-matched pre-filter, in three successive signal-processing stages, into a modified received signal, of which the time-discrete complex rotary phasors each provide phases, which depend exclusively upon the frequency and/or phase offset of the carrier signal used.

The first signal-processing stage is a further sampling, which generates a time-discrete received signal with two sampling values per symbol period. This newly-sampled received signal therefore contains in each discrete complex rotary phasor an additional phase dependent upon the respective sampling timing point, which is compensated in the subsequent second signal-processing stage by a complex multiplication with a complex rotary phasor with a phase inverse to the latter. In a third signal-processing stage, the received signal, with the additional phase removed from the respective time-discrete complex rotary phasor, is finally subjected to a modulus-scaled squaring in order to ensure that the amplitude of each time-discrete complex rotary phasor of the accordingly-modified received signal provides a positive value.

Accordingly, with the method according to the invention and the device according to the invention for carrier-frequency synchronization, a modified received signal, of which the time-discrete complex rotary phasors each provide phases, which are dependent exclusively upon the frequency and/or phase offset of the carrier signal used, is formed from the offset quadrature-phase-modulated received signal.

The time-discrete phases of the modified time-discrete received signal are then determined via an argument function, and a phase characteristic is formed from these. This phase characteristic of the modified received signal, which is periodic over the period $2 \cdot \pi$ and discontinuous, is then "stabilized" at the discontinuity points to form a continuous phase characteristic of the modified received signal.

A continuous phase characteristic of a modified, offset quadrature-phase-modulated received signal generated in this manner can be expediently subjected to a maximum-likelihood estimation in the sense of DE 103 09 262 A1, in order to determine any frequency and/or phase offset occurring in the carrier signal used for a subsequent carrier-frequency synchronization of the received signal.

BRIEF DESCRIPTION OF THE DRAWINGS

A preferred embodiment of the method and the device according to the invention for carrier-frequency synchronization are explained in greater detail below with reference to the drawings. The drawings are as follows.

DETAILED DESCRIPTION

Before describing an embodiment of the method according to the invention and of the device according to the invention for carrier-frequency synchronization in the case of an offset QPSK signal in greater detail with reference to FIGS. 3 to 6, the following section of the description provides a derivation of the mathematical basis required in this context.

Figure 1:
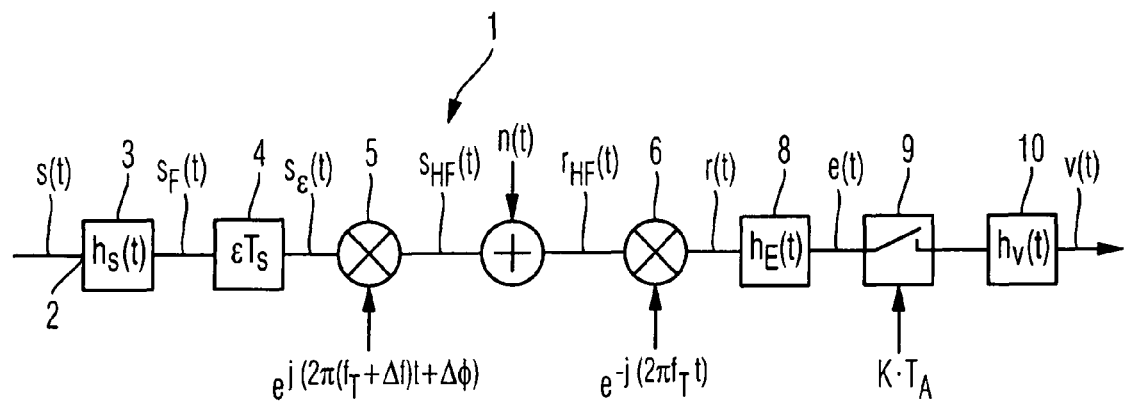
FIG. 1 shows an expanded block circuit diagram of the transmission system.

The starting point is a complex baseband model of a transmission system 1 for continuous-time complex signals, for which the expanded block circuit diagram is presented in FIG. 1.

The complex symbol sequence $s(t)$ of an offset QPSK signal to be transmitted as shown in equation (1) is supplied to the input 2 of the transmission system 1:

$$s(t) = \sum_{n=-\infty}^{+\infty} a_R(n) \cdot \delta(t - nT_S) + j \cdot \sum_{n=-\infty}^{+\infty} a_I(n) \cdot \delta(t - nT_S) \quad (1)$$

In this context $a_R(n)$ and $a_I(n)$ represent the symbol values for the in-phase and quadrature components of the offset QPSK transmission signal to be generated, which can adopt, for example, the real values $\{\pm s_i\}$ of the symbol alphabet. The symbol sequences of the in-phase and quadrature components are periodic in each case with regard to the symbol length $T_s$. In terms of system theory, the symbol sequence $s(t)$ to be transmitted is convoluted in the transmission filter 3 with the associated impulse response $h_s(t)$ and supplies the filtered symbol sequence $s_F(t)$ according to equation (2) at the output of the transmission filter 3:

$$s_F(t) = \sum_{n=-\infty}^{+\infty} a_R(n) \cdot h_S(t - nT_S) + j \cdot \sum_{n=-\infty}^{+\infty} a_I(n) \cdot h_S(t - nT_S) \quad (2)$$

The subsequent lag element 4 models the time offset $\epsilon \cdot T_S$ occurring as a result of absent or inadequate synchronization between the transmitter and the receiver, which is derived from the timing offset $\epsilon$. In this context, the timing offset $\epsilon$ can adopt positive and negative values typically between $\pm 0.5$. The filtered symbol sequence $s_\epsilon(t)$ taking the timing offset $\epsilon \cdot T_S$ into consideration at the output of the lag element 4 is therefore obtained according to equation (3):

$$s_\varepsilon(t) = \sum_{n=-\infty}^{+\infty} a_R(n) \cdot h_S(t - \varepsilon T_S - nT_S) + \\ j \cdot \sum_{n=-\infty}^{+\infty} a_I(n) \cdot h_S(t - \varepsilon T_S - nT_S) \quad (3)$$

The lag-influenced, filtered symbol sequence $s_\epsilon(t)$ is mixed in an offset QPSK modulator—modelled in FIG. 1 as a multiplier 5—with a complex carrier signal $e^{j(2\pi(f_T+\Delta f)t+\Delta\varphi)}$ to form an offset QPSK-modulated transmission signal $s_{HF}(t)$. The carrier signal $e^{j(2\pi(f_T+\Delta f)t+\Delta\varphi)}$ has a carrier frequency $f_T$, which provides a frequency offset $\Delta f$ and a phase offset $\Delta\varphi$ as a result of the absence of carrier-frequency synchronization. Ignoring signal errors of the quadrature modulator, such as overdrive in the carrier signal on the in-phase or respectively quadrature channel, gain imbalance between the in-phase and quadrature channel, quadrature error between the in-phase and the quadrature channel, the mathematical relationship of the offset QPSK-modulated transmission signal $s_{HF}(t)$ is obtained as shown in equation (4):

$$s_{HF}(t) = \begin{bmatrix} \sum_{n=-\infty}^{+\infty} a_R(n) \cdot h_S(t - \varepsilon T_S - nT_S) + + \\ j \cdot \sum_{n=-\infty}^{+\infty} a_I(n) \cdot h_S\left(t - \varepsilon T_S - \frac{T_S}{2} - nT_S\right) \end{bmatrix} \cdot \\ e^{j(2\pi(f_T+\Delta f)t+\Delta\varphi)} \quad (4)$$

By comparison with the symbol sequence of the quadrature component of the offset QPSK-modulated transmission signal $s_{HF}(t)$, the symbol sequence of the interface component is phase-displaced by one symbol period.

On the transmission path between the transmitter and the receiver, an additive white Gaussian noise (AWGN) $n(t)$ is superposed additively on the offset QPSK-modulated transmission signal $s_{HF}(t)$, which provides a real and imaginary component $n_R(t)$ and $n_I(t)$ as shown in equation (5)

$$n(t)=n_R(t)+j \cdot n_I(t) \quad (5)$$

The received signal $r_{HF}(t)$ received by the receiver is therefore obtained according to equation (6):

$$r_{HF}(t)=s_{HF}(t)+n(t) \quad (6)$$

In the receiver, the offset QPSK-modulated received signal $r_{HF}(t)$ with superposed noise $n(t)$ is mixed down into the baseband with the carrier signal $e^{-j2\pi f_T t}$ in a demodulator modelled in FIG. 1 as the multiplier 6. The demodulated received signal $r(t)$ at the output of the demodulator 6, which contains an in-phase and quadrature symbol sequence distorted with the frequency and phase offset of the carrier signal, is obtained according to equation (7):

$$r(t) = s_\varepsilon(t) \cdot e^{j(2\pi\Delta f t + \Delta\varphi)} + n(t) = \begin{bmatrix} \sum_{n=-\infty}^{+\infty} a_R(n) \cdot h_S(t - \varepsilon T_S - nT_S) + \\ j \cdot \sum_{n=-\infty}^{+\infty} a_I(n) \cdot h_S\left(t - \varepsilon T_S - \frac{T_S}{2} - nT_S\right) \end{bmatrix} \cdot e^{j(2\pi\Delta f t + \Delta\varphi)} + n(t) \quad (7)$$

Figure 2:
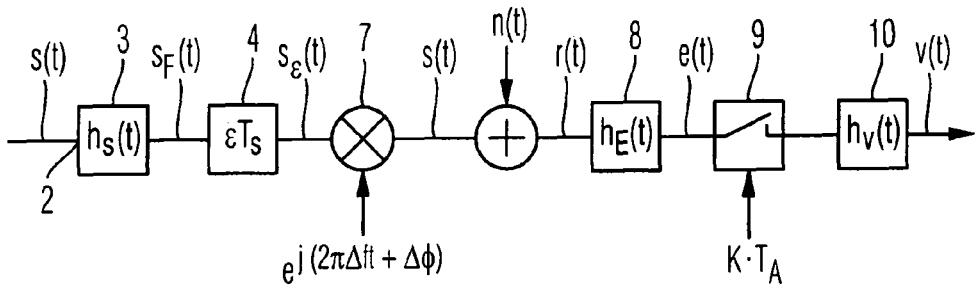
FIG. 2 shows a reduced block circuit diagram of the transmission system.

As shown in equation (7), the system-theoretical effects of the modulator 5 and of the demodulator 6 of the transmission system 1 on the offset QPSK-modulated signal are partially cancelled, so that the modulator 5 and the demodulator 6 in FIG. 1 can be replaced by a single multiplier 7 as shown in the reduced block circuit diagram of FIG. 2, which mixes the lag-influenced, filtered symbol sequence $s_\varepsilon(t)$ with a signal $e^{j(2\pi\Delta f t + \Delta\varphi)}$ according to equation (8) to provide a transmission signal $s_{NF}(t)$ in the baseband.

$$s_{NF}(t) = \begin{bmatrix} \sum_{n=-\infty}^{+\infty} a_R(n) \cdot h_S(t - \varepsilon T_S - nT_S) + \\ j \cdot \sum_{n=-\infty}^{+\infty} a_I(n) \cdot h_S\left(t - \varepsilon T_S - \frac{T_S}{2} - nT_S\right) \end{bmatrix} \cdot e^{j(2\pi\Delta f t + \Delta\varphi)} \quad (8)$$

The transmission signal $s(t)$ with superposed additive white Gaussian noise $n(t)$ as shown in the reduced block circuit diagram in FIG. 2 is received in the receiver as a received signal $r(t)$, which corresponds to the received signal according to equation (7) of the extended block circuit diagram shown in FIG. 1.

The received signal $r(t)$ is convoluted in the receiver filter 8 as shown in equation (9) with the associated impulse response $h_E(t)$ and leads to the signal $e(t)$ at the output of the receiver filter 8, which represents an in-phase and quadrature symbol sequence filtered and distorted with reference to signal error and frequency and phase offset:

$$e(t)=r(t)*h_E(t) \quad (9)$$

The received signal $r(t)$ is filtered by the receiver filter 8 with the impulse response $h_E(t)$ and provides the filtered received signal $e(t)$ at its output. The receiver filter 8 is a signal-matched filter. A signal-matched filter according to equation (10) provides an impulse response $h_E(t)$ corresponding to the impulse response $h_s(t)$ of the transmitter filter 3 and accordingly a transmission function $H_E(f)$ reflected relative to the transmission function $H_s(f)$ as shown in equation (11):

$$h_E(t)=h_S(-t) \quad (10)$$

$$H_E(f)=H_S(-f) \quad (11)$$

In this manner, the signal-noise distance of the filtered received signal $e(t)$ is maximized as a ratio of the useful power relative to the interference power.

Following the receiver filter 8, a sampling of the filtered received signal is implemented in a sampling and holding element 9 referred to below as the second sampling and holding element with a sampling rate $f_A$, which is increased by comparison with the symbol frequency $f_s$ of the received signal $r(t)$ by the over-sampling factor os. In this context, the over-sampling factor os provides a value of 8, as shown in detail in [1]: K. Schmidt: "Digital clock-pulse recovery for band-width efficient mobile telephone systems", 1994, ISBN 3-18-14 75 10-6.

After the sampling of the filtered received signal $e(t)$, another pre-filtering of the signal is implemented in a pre-filter 10. The purpose of the pre-filter 10 is to minimize the data-dependent jitter in the signal. For this purpose, the frequency spectrum $H_E(f)$ of the receiver filter 8 is linked multiplicatively to the frequency spectrum $H_V(f)$ of the pre-filter 10 according to equation (12) to form a combined frequency spectrum $H_{EV}(f)$:

$$H_{EV}(f)=H_E(f) \cdot H_V(f) \quad (12)$$

If the transmitter filter 3 according to equation (13) provides a frequency spectrum $H_s(t)$, which corresponds to a root-cosine filter with a roll-off factor r, the common frequency spectrum $H_{EV}(f)$ of the receiver filter 8 and of the pre-filter 10 according to equation (14) must be designed dependent upon the frequency spectrum $H_s(f)$ of the transmitter filter 3 in order to minimize data-dependent jitter in the received signal $r(t)$ as shown in [1].

$$H_S(f) = \begin{cases} 1 & \text{for } |f| < \dfrac{f_S}{2} \\ \cos\left[\dfrac{\pi|f|}{2rf_S} - \dfrac{\pi(1-r)}{4r}\right] & \text{for } (1-r)\dfrac{f_S}{2} < |f| \leq (1+r)\dfrac{f_S}{2} \\ 0 & \text{for } (1+r)\dfrac{f_S}{2} < |f| \end{cases} \quad (13)$$

$$H_{EV}(f) = \begin{cases} H_S(f-f_S) + H_S(f+f_S) & \text{for } |f| \leq \dfrac{f_S}{2}(1+r) \\ \text{random} & \text{for } \dfrac{f_S}{2}(1+r) < |f| \leq f_S \\ 0 & \text{for } f_S < |f| \end{cases} \quad (14)$$

According to equation (15), the frequency response $H_{GES}(f)$ can be interpreted as a low-pass filter $H_{GES0}(f)$ symmetrical to the frequency $f=0$ with a bandwidth of $$\dfrac{f_S}{2} \cdot r,$$

which is frequency-displaced in each case by $$\pm \frac{f_S}{2}:$$

$$H_{GES}(f) = H_{GES0}(f) * \left(\delta\left(f - \frac{f_S}{2}\right) + \delta\left(f + \frac{f_S}{2}\right)\right) = \qquad (15)$$
$$= H_{GES0}\left(f - \frac{f_S}{2}\right) + H_{GES0}\left(f + \frac{f_S}{2}\right)$$

The corresponding impulse response $h_{GES}(t)$ is therefore obtained as shown in equation (16):

$$h_{GES}(t) = h_{GES0}(t) \cdot \left(e^{j2\pi\frac{f_S}{2}t} + e^{-j2\pi\frac{f_S}{2}t}\right) = h_{GES0}(t) \cdot \cos\left(2\pi\frac{f_S}{2}t\right) \qquad (16)$$

The signal v(t) at the output of the pre-filter 10 can be obtained accordingly by replacing the impulse response $h_s(t)$ of the transmitter filter 3 in the baseband according to equation (8) with the impulse response $h_{GES}(t)$ of the overall transmission system in the transmitter signal $s_{NF}(t)$ as shown in equation (17):

$$v(t) = s_{NF}(t) * h_{GES}(t) = \left[\sum_{n=-\infty}^{+\infty} a_R(n) \cdot h_{GES}(t - \varepsilon T_S - nT_S) + \right. \qquad (17)$$
$$\left. j \cdot \sum_{n=-\infty}^{+\infty} a_I(n) \cdot h_{GES}\left(t - \varepsilon T_S - \frac{T_S}{2} - nT_S\right)\right] \cdot e^{j(2\pi\Delta ft + \Delta\varphi)}$$

Starting from equation (16), the impulse response $h_{GES}(t-\varepsilon T_S - nT_S)$ can be described according to equation (18)

$$h_{GES}(t - \varepsilon T_S - nT_S) = \qquad (18)$$
$$h_{GES0}(t - \varepsilon T_S - nT_S) \cdot (-1)^n \cdot \cos\left(2\pi\frac{f_S}{2}(t - \varepsilon T_S)\right)$$

Similarly, the mathematical relationship of equation (19) can be determined for the impulse response $$h_{GES}\left(t - \varepsilon T_S - \frac{T_S}{2} - nT_S\right).$$

$$h_{GES}\left(t - \varepsilon T_S - \frac{T_S}{2} - nT_S\right) = \qquad (19)$$
$$h_{GES0}\left(t - \varepsilon T_S - \frac{T_S}{2} - nT_S\right) \cdot (-1)^n \cdot \sin\left(2\pi\frac{f_S}{2}(t - \varepsilon T_S)\right)$$

On the basis of the mathematical terms in equations (118) and (19), the combinations shown in equation (20) and (21), and therefore the mathematical context for the output signal v(t) of the pre-filter 10 in the event of an excitation of the transmission system 1 with an offset QPSK signal s(t), can be transferred from equation (17) to equation (22).

$$R(t) = \sum_{n=-\infty}^{+\infty} a_R(n) \cdot h_{GES0}(t - \varepsilon T_S - nT_S) \cdot (-1)^n \qquad (20)$$

$$I(t) = \sum_{n=-\infty}^{+\infty} a_I(n) \cdot h_{GES0}\left(t - \varepsilon T_S - \frac{T_S}{2} - nT_S\right) \cdot (-1)^n \qquad (21)$$

$$v(t) = \left[R(t) \cdot \cos\left(2\pi\frac{f_S}{2}(t - \varepsilon T_S)\right) + \right. \qquad (22)$$
$$\left. j \cdot I(t) \cdot \sin\left(2\pi\frac{f_S}{2}(t - \varepsilon T_S)\right)\right] \cdot e^{j(2\pi\Delta ft + \Delta\varphi)}$$

The signal v(t) at the output of the pre-filter 10 according to equation (22) is delayed in a downstream delay element 11 by the timing offset $-\hat{\varepsilon} \cdot T_S$. The estimated timing offset $\hat{\varepsilon}$, which is determined by an estimation unit not illustrated here for the estimation of the timing offset $\hat{\varepsilon}$ of an offset QPSK-modulated signal, corresponds, with optimum clock-pulse synchronization, to the actual timing offset E of the offset QPSK-modulated signal v(t). In this case, timing offset is removed completely from the output signal $v_\varepsilon(t)$ of the delay element 11 according to equation (23).

$$v_\varepsilon(t) = \left[R_\varepsilon(t) \cdot \cos\left(2\pi\frac{f_S}{2} \cdot t\right) + j \cdot I_\varepsilon(t) \cdot \sin\left(2\pi\frac{f_S}{2} \cdot t\right)\right] \cdot e^{j(2\pi\Delta f \cdot t + \Delta\phi)} \qquad (23)$$

The associated combinations $R_\varepsilon(t)$ and $I_\varepsilon(t)$ with the timing offset $\varepsilon \cdot T_S$ removed are obtained according to equations (24) and (25):

$$R_\varepsilon(t) = \sum_{n=-\infty}^{+\infty} a_R(n) \cdot h_{GES0}(t - nT_S) \cdot (-1)^n \qquad (24)$$

$$I_\varepsilon(t) = \sum_{n=-\infty}^{+\infty} a_I(n) \cdot h_{GES0}\left(t - \frac{T_S}{2} - nT_S\right) \cdot (-1)^n \qquad (25)$$

Equations (23), (24) and (25) show that the time-synchronized received signal $v_\varepsilon(t)$ is not in the time-discrete form required for a use of the maximum-likelihood method for determining the estimated frequency-offset and phase-offset value $\Delta\hat{f}$ and $\Delta\hat{\phi}$ according to equation (26):

$$r(t') = |r(t')| \cdot e^{j(2\pi\Delta \hat{f} t' + \Delta\phi)} \qquad (26)$$

The time-synchronized received signal $v_\varepsilon(t)$ is therefore converted according to the invention into a form corresponding to equation (26) as will be shown below.

For this purpose, if the output signal $v_\varepsilon(t)$ of the delay unit 11 is observed only at the discrete timing points $$t' = \mu \cdot \frac{T_S}{2} \quad (\mu = 0, 1, 2, \ldots 2 \cdot N - 1),$$

the output signal $v_\varepsilon(t')$ of the delay unit 11 is composed, according to equations (27a), (27b), (27c) and (27d) and dependent upon the timing point observed, only of a purely real or purely imaginary component and a complex rotary phasor $e^{j(2\pi\Delta f \cdot t' + \Delta\phi)}$:

$$t' = 0 \cdot \frac{T_S}{2}: v_\varepsilon(t') = [R_\varepsilon(t')] \cdot e^{j(2\pi\Delta f \cdot t' + \Delta\phi)} \quad (27a)$$

$$v_\varepsilon(t) = R_\varepsilon(t) \cdot e^{j(0\frac{\pi}{2})} \cdot e^{j(2\pi\Delta f \cdot t + \Delta\phi)}$$

$$t' = 1 \cdot \frac{T_S}{2}: v_\varepsilon(t') = [j \cdot I_\varepsilon(t')] \cdot e^{j(2\pi\Delta f \cdot t' + \Delta\phi)} \quad (27b)$$

$$v_\varepsilon(t') = I_\varepsilon(t') \cdot e^{j(1\frac{\pi}{2})} \cdot e^{j(2\pi\Delta f \cdot t' + \Delta\phi)}$$

$$t' = 2 \cdot \frac{T_S}{2}: v_\varepsilon(t') = [-R_\varepsilon(t')] \cdot e^{j(2\pi\Delta f \cdot t' + \Delta\phi)} \quad (27c)$$

$$v_\varepsilon(t') = R_\varepsilon(t') \cdot e^{j(2\frac{\pi}{2})} \cdot e^{j(2\pi\Delta f \cdot t' + \Delta\phi)}$$

$$t' = 3 \cdot \frac{T_S}{2}: v_\varepsilon(t') = [-j \cdot I_\varepsilon(t')] \cdot e^{j(2\pi\Delta f \cdot t' + \Delta\phi)} \quad (27d)$$

$$v_\varepsilon(t') = I_\varepsilon(t') \cdot e^{j(3\frac{\pi}{2})} \cdot e^{j(2\pi\Delta f \cdot t' + \Delta\phi)}$$

According to equations (24) and (25), the combinations $R_\varepsilon(t')$ and $I_\varepsilon(t')$ represent the real-value low-pass signals, which can be either positive or negative because of the statistical distribution of the symbol sequences $a_r(n)$ and $a_I(n)$. In the paragraphs below, they are each described by the time-dependent, real-value amplitude $A(t')$. Accordingly, instead of individual timing-point-related equations (27a), (27b), (27c) and (27d) for the output signal $v_\varepsilon(t')$ of the delay element 11, a single mathematical equation (28) containing all of the timing points is obtained at the individual timing points $$t' = \mu \cdot \frac{T_S}{2} (\mu = 0, 1, 2, \ldots 2 \cdot N - 1) \quad (30)$$

for the output signal $v_\varepsilon(t')$ of the delay element 11:

$$v_\varepsilon(t') = A(t') \cdot e^{j(\mu \cdot \frac{\pi}{2})} \cdot e^{j(2\pi\Delta f \cdot t' + \Delta\phi)} \text{ for } t' = \mu \cdot \frac{T_S}{2} \quad (28)$$

If the time-discrete output signal $v_\varepsilon(t')$ of the delay element 11 at the individual sampling times $$t' = \mu \cdot \frac{T_S}{2}, \mu = 0, 1, 2, \ldots 2 \cdot N - 1$$

is phase-displaced by a timing-point-related phase angle $$-\mu \cdot \frac{T_S}{2},$$

a phase-displaced, time-discrete signal w(t'), from which, by comparison with the time-discrete output signal $v_\varepsilon(t')$ of the delay element 11, the complex term $$e^{j\mu\frac{T_S}{2}}$$

has been removed, is obtained according to equation (29) from the time-discrete output signal $v_\varepsilon(t')$ of the delay element 11:

$$w(t') = A(t') \cdot e^{j(2\pi\Delta f \cdot t' + \Delta\phi)} \quad (29)$$

Since the amplitude $A(t')$ of the signal w(t') can adopt positive and negative values, a modulus-formation of the amplitude A (I') should be implemented. A modulus formation of the amplitude of a complex signal is implemented by squaring with subsequent division by the modulus. The phase of the complex signal is doubled by this process, but the modulus remains unchanged.

Figure 5:
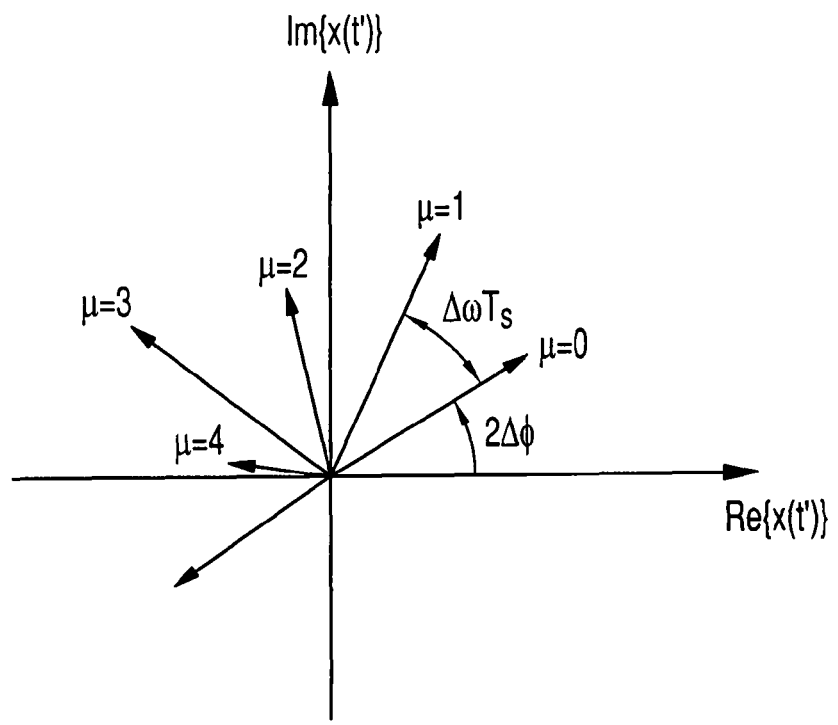
FIG. 5 shows a time characteristic for a discontinuous phase characteristic and for the "stabilized" continuous phase characteristic of a received signal modified according to the invention.

The application of squaring and subsequent division by the modulus to the signal w(t') leads to the signal x(t') according to equation (30), which can be interpreted as a time-discrete complex rotary phasor with a time-discrete amplitude $|A(t')|$ and a time-discrete phase $2 \cdot (2\pi\Delta ft' + \Delta\phi) = 2 \cdot (\phi\omega\mu T_S + \Delta\phi)$ as shown in FIG. 5, and which is in the form according to equation (26) appropriate for a maximum-likelihood estimation of the frequency and phase offset of the carrier signal:

$$x(t') = |A(t')| \cdot e^{j2(2\pi\Delta f \cdot t' + \Delta\phi)} + n(t') \quad (30)$$

Moreover, equation (30) takes into consideration the additive interference n(t'), which, in a good approximation, is uncorrelated and provides a Gaussian distribution. Accordingly, the optimum estimated value for $\Delta f$ und $\Delta\phi$ is obtained by the maximization of the maximum-likelihood function $L(\Delta\hat{f}, \Delta\hat{\phi})$, which, according to equation (31) corresponds to a maximization of the real components of all time-discrete, complex rotary phasors of the signal x(t'), and an estimated value $\Delta\hat{f}$ and $\Delta\hat{\phi}$ for the frequency and phase offset of the carrier signal can be determined.

$$L\left(\Delta\hat{f}, \Delta\hat{\phi}\right) = \mathrm{Re}\left\{\sum_\mu x\left(t' = \mu\frac{T_S}{2}\right) \cdot e^{-j2\left(2\pi\Delta\hat{f}\mu\frac{T_S}{2} + \Delta\hat{\phi}\right)}\right\} \quad (31)$$

The maximization of the real components of all time discrete complex rotary phasors of the signal x(t') can be interpreted as a "turning back" of the time-discrete, complex rotary phasor of the signal x(t') in each case by the phase angle $$2 \cdot \left(2\pi\Delta f\mu\frac{T_S}{2} + \Delta\varphi\right),$$

until these coincide with the real axis in the complex plane.

Figure 3:
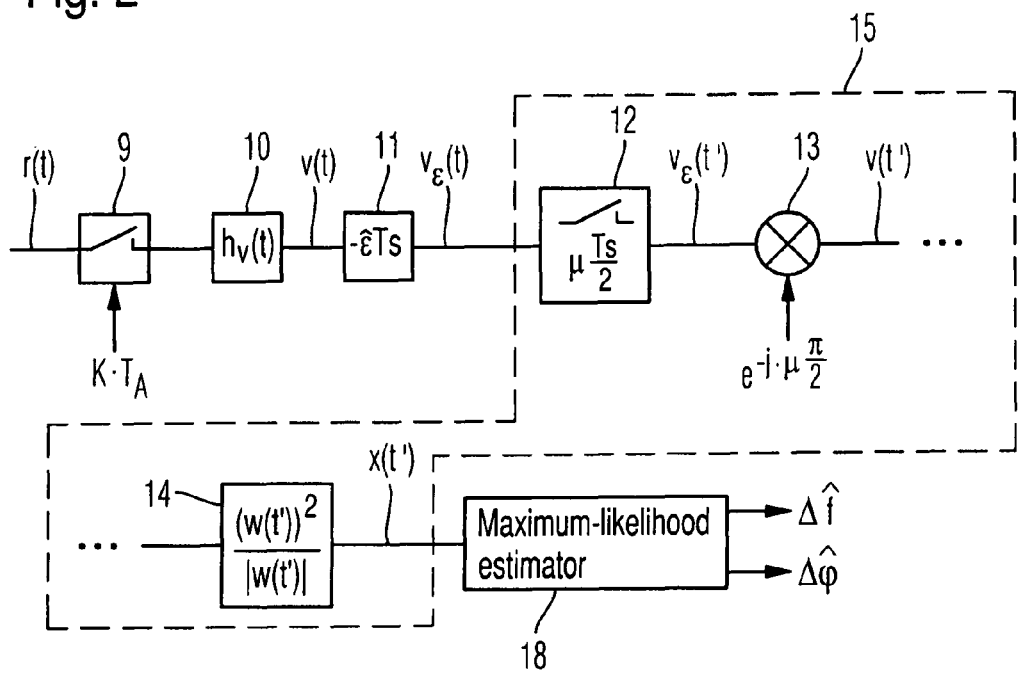
FIG. 3 shows a block circuit diagram of the device according to the invention for carrier-frequency synchronization.
Figure 4:
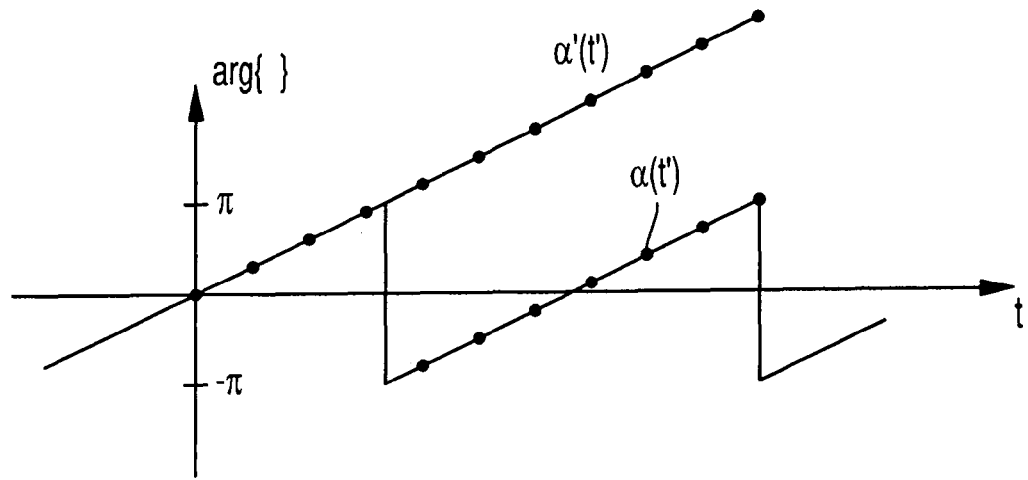
FIG. 4 shows a complex phasor diagram of a received signal modified according to the invention.
Figure 6:
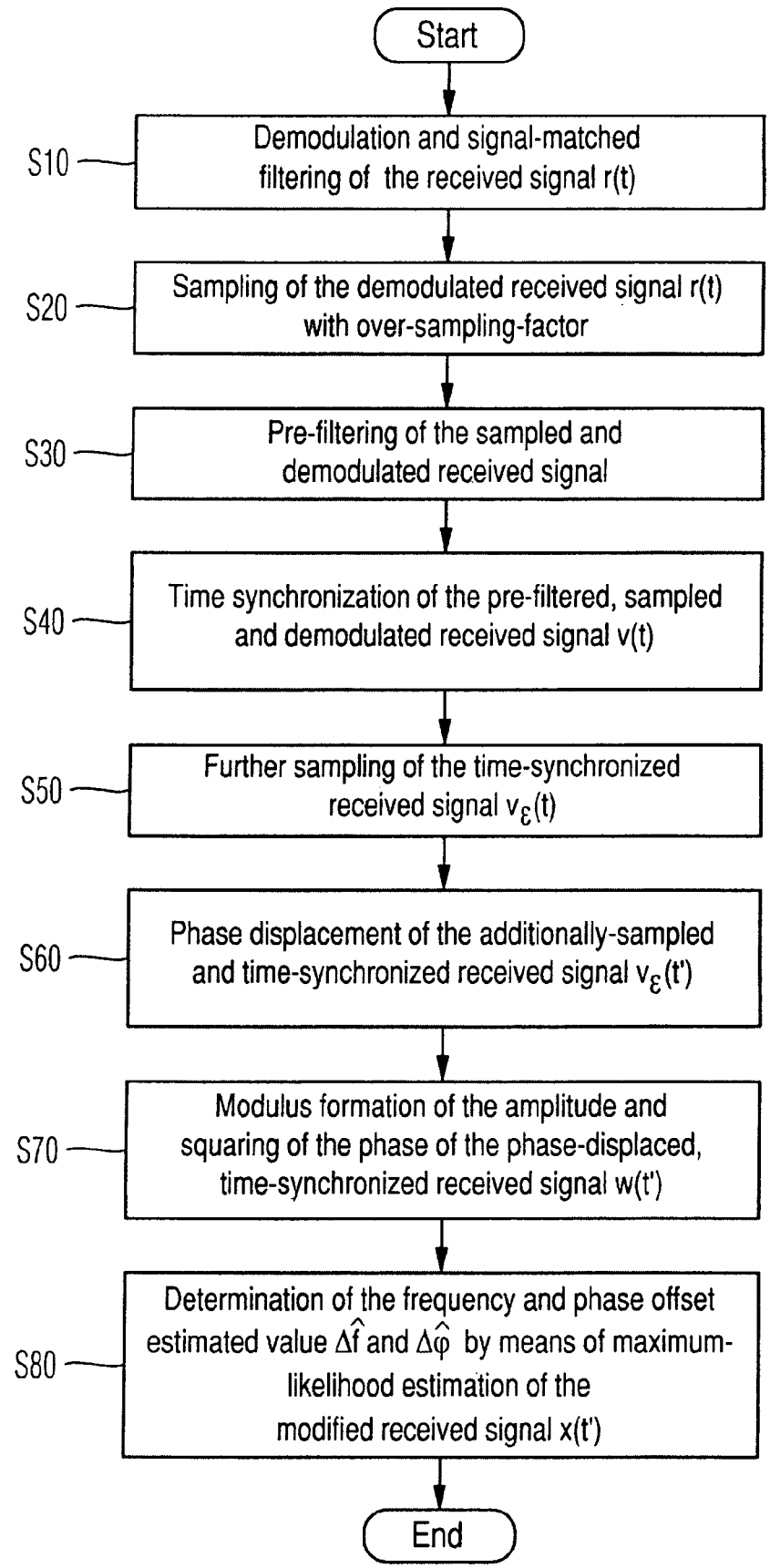
FIG. 6 shows a flow chart for the method according to the invention for carrier-frequency synchronization.

Starting from this derivation of the mathematical basis, the following paragraphs describe the device according to the invention for carrier-frequency synchronization in the case of an offset QPSK-modulated signal as shown in FIG. 3 and of the method according to the invention for carrier-frequency synchronization in the case of an offset QPSK-modulated signal as shown in FIG. 6.

In the device according to the invention shown in FIG. 3, the clock-pulse synchronized output signal $v_\varepsilon(t)$ of the delay element is under-sampled in a sampling and holding element 12 referred to below as the first sampling and holding element at two sampling values per symbol period $T_s$.

The output signal $v_\varepsilon(t')$ of the first sampling and holding element 12 is supplied to a complex multiplier 13, in which it is subjected to a sampling timing-point-related phase displacement through the phase angle $$-\mu \cdot \frac{T_S}{2}.$$

The output signal w(t') of the complex multiplier 13 accordingly phase-displaced relative to the signal $v_\varepsilon(t')$ is supplied to a unit for modulus-scaled squaring 14, consisting of a squarer followed by a division by the modulus, in which the modulus of its amplitude is formed and its phase is doubled.

The signal at the output of the unit for modulus-scaled squaring 14 represents the modified received signal x(t'), which the signal-processor 15 has generated from the clock-pulse-synchronized received signal $v_\epsilon(t)$ by under-sampling in the first sampling and holding element 12, by phase-displacement in the complex multiplier 13 and by forming the modulus of the amplitude and doubling the respective phase in the unit for modulus-scaled squaring 14.

In a subsequent maximum-likelihood estimator 18, the estimated values $\Delta \hat{f}$ and $\Delta \hat{\phi}$ for the frequency and phase offset of the carrier signal are determined from the time-discrete, modified received signal x(t'), as described, for example, in DE 103 09 262 A1.

A frequency-offset and phase-offset estimator, which avoids 2·π slips—so-called "cycle slips"—occurring in the phase characteristic, which result through small amplitudes of the time-discrete, modified received signal x(t') from the superposed interference in the case of a phase regression, as described, for example, in DE 103 09 262 A1, can be used as a maximum-likelihood estimator. The phase regression cannot therefore be used for this application.

The method according to the invention for carrier-frequency synchronization of an offset QPSK-modulated signal is described below with reference to FIG. 6.

As shown in FIG. 6, procedural stage S10 of the method according to the invention for carrier-frequency synchronization of an offset QPSK-modulated signal provides a demodulation of the received signal r(t) according to equation (7). Through an appropriate design of the receiver to transmitter filter, a signal-matched filtering of the received signal r(t), which leads to an optimization of the signal-noise distance in the received signal r(t), is implemented at the same time as the demodulation.

In the next procedural stage S20, in a second sampling unit, the received signal r(t) is sampled with an over-sampling factor typically with a value of 8.

The sampled received signal is supplied in procedural stage S30 to a pre-filter according to equation (17), which minimizes data-dependent jitter in the received signal r(t).

A time-synchronization of the sampled, filtered and modulated received signal v(t) is provided in the next procedural stage S40 according to equation (23) by means of a delay element, which obtains the estimated timing offset $\hat{\epsilon}$ from an estimator, which is not described in greater detail here.

In the next procedural stage S50, an additional sampling—a first sampling—of the time-synchronized received signal $v_\epsilon(t)$ is implemented at two sampling values per symbol period $T_s$ as shown in equation (28).

A sampling timing-point-related phase displacement of the additionally-sampled, time-synchronized received signal $v_\epsilon(t')$ is implemented by complex multiplication with a sampling timing-point-related multiplication factor $$e^{-j\mu \frac{T_S}{2}}$$

in order to compensate the respective inverse, complex factor $$e^{j\mu \frac{T_S}{2}}$$

in the received signal $v_\epsilon(t')$ according to equation (29) in the next procedural stage S60.

The next procedural stage S70 provides the modulus formation of the time-discrete amplitudes A(t') and squaring of the time-discrete phases $2\pi\Delta ft'+\Delta\phi$ of the phase-displaced, additionally-sampled and time-synchronized received signal w(t') according to equation (30).

In the next procedural stage S80, the time-discrete, modified receiver signal x(t') obtained from the time-synchronized received signal $v_\epsilon(t)$ in procedural stages S50, S60 and S70 by means of a signal-processor 15 is used to determine its time-discrete, continuous phase characteristic $\alpha'(t')$.

In procedural stage S80, the estimated frequency-offset and phase-offset values $\Delta \hat{f}$ and $\Delta \hat{\phi}$ of the carrier signal are determined according to equation (31) by means of maximum-likelihood estimation. The modified received signal x(t') is used for this purpose. The maximum-likelihood estimator used in this context should ideally be able to deal with phase slips—so-called "cycle slips"—resulting from interference signals superposed on the modified received signal $v_\epsilon(t)$ at small amplitudes of the modified received signal $v_\epsilon(t)$, and is disclosed, for example, in DE 103 09 262 A1.

The invention claimed is:

1. Method for carrier-frequency synchronization of a carrier signal influenced by a frequency and/or phase offset comprising
    estimating the frequency and/or phase offset of the carrier signal by estimating maximum-likelihood from a received signal with time-discrete complex rotary phasors, wherein only the time-discrete phases are dependent upon the frequency and/or phase offset, and wherein the received signal is an offset quadrature-modulated received signal,
    converting the received signal for the maximum-likelihood estimation via a first pre-filtering step into a modified received signal with time-discrete complex rotary phasors wherein the conversion of the received signal comprises a first sampling at two sampling values per symbol period, a complex multiplication, and a modulus-scaled squaring, the modulus-scaled squaring comprising implementing squaring and inverse modulus formation, and
    maximizing the real components of the complex rotary phasors for the maximum-likelihood estimation of the frequency and/or phase offset,
    wherein the conversion of the received signal is preceded by a demodulation, a second sampling, a second pre-filtering, and a clock-pulse synchronization.

2. Method for carrier-frequency synchronization according to claim 1, comprising implementing the complex multiplication with a complex phase angle $e^{-j\mu\pi/2}$, wherein μ is a sampling index.

3. Method for carrier-frequency synchronization according to claim 1, comprising following the conversion of the offset quadrature-modulated received signal with the maximum-likelihood estimation of the frequency and phase offset of the carrier signal.

4. Device for carrier-frequency synchronization of a carrier signal influenced by a frequency and/or phase offset comprising:
    a maximum-likelihood estimator for the estimation of the frequency and/or phase offset of the carrier signal from a received signal with time-discrete complex rotary phasors, in which only the time-discrete phases are dependent upon the frequency and/or phase offset, and
    a pre-filter and a signal-processor preceding the maximum-likelihood estimator, wherein the pre-filter and signal processor convert the received signal, wherein the received signal is an offset-quadrature-phase-modulated received signal, and is modified with time-discrete complex rotary phasors, the device further comprising one or more of the group consisting of: (a) a demodulator and a delay element for clock-pulse synchronization connected upstream of the signal-processor, (b) a second sampling unit connected upstream of the pre-filter, and (c) the maximum-likelihood estimator connected downstream of the signal-processor, wherein the maximum-likelihood estimator maximizes the real components of the complex rotary phasors for the estimation of the frequency and/or phase offset, and wherein the signal-processor comprises a first sampling unit, a complex multiplier, and a unit for modulus-scaled squaring, and wherein the unit for modulus-scaled squaring comprises a squarer, a modulus former connected in parallel to the squarer, and a divider connected downstream of the squarer and the modulus former.

5. Device for carrier-frequency synchronization of claim 4, comprising the demodulator and the delay element for clock-pulse synchronization connected upstream of the signal-processor.

6. Device for carrier-frequency synchronization according to claim 4, comprising the second sampling unit connected upstream of the pre-filter.

7. Device for carrier-frequency synchronization according to claim 4, comprising the maximum-likelihood estimator connected downstream of the signal-processor.

8. Method for carrier-frequency synchronization of a carrier signal influenced by a frequency and/or phase offset comprising:

estimating the frequency and/or phase offset of the carrier signal by estimating maximum-likelihood from a received signal with time-discrete complex rotary phasors, wherein only the time-discrete phases are dependent upon the frequency and/or phase offset, and wherein the received signal is an offset quadrature-modulated received signal;

converting the received signal for the maximum-likelihood estimation via a first pre-filtering step into a modified received signal with time-discrete complex rotary phasors, wherein the conversion of the received signal comprises a first sampling at two sampling values per symbol period, a complex multiplication, and a modulus-scaled squaring, the modulus-scaled squaring comprising implementing squaring and inverse modulus formation;

following the conversion of the offset quadrature-modulated received signal with the maximum-likelihood estimation of the frequency and phase offset of the carrier signal; and maximizing the real components of the complex rotary phasors for the maximum-likelihood estimation of the frequency and/or phase offset.

9. Method for carrier-frequency synchronization according to claim 8, comprising implementing the complex multiplication with a complex phase angle $e^{-j\mu\pi/2}$, wherein $\mu$ is a sampling index.

* * * * *